United States Patent
Lin et al.

(10) Patent No.: US 11,356,185 B1
(45) Date of Patent: Jun. 7, 2022

(54) METHOD AND MEASURING APPARATUS FOR MEASURING NOISE OF DEVICE UNDER TEST

(71) Applicant: Realtek Semiconductor Corp., HsinChu (TW)

(72) Inventors: Kai-Yue Lin, HsinChu (TW); Liang-Wei Huang, HsinChu (TW); Kuei-Ying Lu, HsinChu (TW); Hsuan-Ting Ho, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/464,659

(22) Filed: Sep. 1, 2021

(30) Foreign Application Priority Data

Mar. 23, 2021 (TW) ................................. 110110329

(51) Int. Cl.
*H04B 17/00* (2015.01)
*H04B 17/336* (2015.01)

(52) U.S. Cl.
CPC ....... *H04B 17/0085* (2013.01); *H04B 17/336* (2015.01)

(58) Field of Classification Search
CPC .......................... H04B 17/0085; H04B 17/336
See application file for complete search history.

(56) References Cited

U.S. PATENT DOCUMENTS

| 8,861,578 B1* | 10/2014 | Lusted ................. H04B 17/104 375/353 |
| 10,937,488 B2* | 3/2021 | Lee .......................... G11C 7/02 |
| 2019/0042380 A1* | 2/2019 | Das Sharma ....... G06F 13/4282 |

* cited by examiner

*Primary Examiner* — Vineeta S Panwalkar
(74) *Attorney, Agent, or Firm* — Winston Hsu

(57) ABSTRACT

A method and a measuring apparatus for measuring noise of a device under test (DUT) is provided, wherein the DUT is connected to a link partner (LP) device via a cable, and the measuring apparatus is coupled to the DUT and LP device. The method includes: controlling the LP device to transmit a far-end data sequence to the DUT according to transmission data; controlling the DUT to recover the transmission data for generating aided-data sequence according to the transmission data, wherein the aided-data sequence is configured to perform cancellation with a received far-end data sequence to generate a cancellation result; generating a first noise value and a second noise value in a first training phase and a second training phase, respectively; and estimating noise from at least one circuit according to the first noise value and the second noise value.

14 Claims, 7 Drawing Sheets

METHOD AND MEASURING APPARATUS FOR MEASURING NOISE OF DEVICE UNDER TEST

BACKGROUND OF THE INVENTION

1. Field of the Invention

The present invention is related to measurement of noise, and more particularly, to a method and a measuring apparatus for measuring noise of a device under test (DUT).

2. Description of the Prior Art

When an Ethernet transceiver transmits data to an external device through a digital-to-analog converter (DAC), a portion of noise on the data may be reflected from a cable. When measuring such noise, a related art method may stop data transmission at the other side of the cable (so that the Ethernet transceiver does not receive the signal from the other side of the cable) to ensure that the detected noise only includes the reflected noise mentioned above, rather than mixing additional signals (e.g., the signal or noise from the other side of the cable).

When the other side of the cable (e.g., a link partner device connected to the Ethernet transceiver under test via the cable) sends data to the Ethernet transceiver under test, the loading on an output terminal of the Ethernet transceiver may change, thereby impacting an amount of the reflected noise. Using the measuring method of the related art, in practice, the amount of reflected noise cannot be precisely estimated.

Thus, there is a need for a novel method and an associated measuring apparatus that can solve the problem of the related art without introducing any side effect or in a way that is less likely to introduce side effects.

SUMMARY OF THE INVENTION

An objective of the present invention is to provide a method and a measuring apparatus for measuring noise of a device under test (DUT), to solve the problem of the related art.

At least one embodiment of the present invention provides a method for measuring noise of a DUT, wherein the DUT is connected to a link partner (LP) device via a cable. The method may comprise: controlling a pseudo noise generator of the LP device to generate a far-end data sequence according to transmission data, and transmitting the far-end data sequence to the DUT via the cable; controlling a pseudo noise descrambler of the DUT to recover the transmission data according to the far-end data sequence received by the DUT, to allow a pseudo noise generator of the DUT to generate an aided-data sequence according to the transmission data, wherein the aided-data sequence is configured to perform cancellation with the far-end data sequence received by the DUT to generate a cancellation result; under a condition where the LP device transmits the far-end data sequence to the DUT and the DUT substantially transmits no data to the LP device, obtaining a first noise value according to the cancellation result; under a condition where the LP device transmits the far-end data sequence to the DUT and the DUT utilizes at least one circuit therein to transmit the aided-data sequence to the LP device at the same time, obtaining a second noise value according to the cancellation result; and calculating a difference between the first noise value and the second noise value, to estimate noise from the at least one circuit.

At least one embodiment of the present invention provides a measuring apparatus for measuring noise of a DUT, wherein the DUT is connected to a LP device via a cable, and the measuring apparatus is coupled to the DUT and the LP device. The measuring apparatus may comprise a storage circuit and a processing circuit. The storage circuit is configured to store a program code. The processing circuit is coupled to the storage circuit, and is configured to control the measuring apparatus according to the program code to transmit control signals to the DUT and the LP device. The measuring apparatus controls a pseudo noise generator of the LP device to generate a far-end data sequence according to transmission data, and transmits the far-end data sequence to the DUT via the cable; the measuring apparatus controls a pseudo noise descrambler of the DUT to recover the transmission data according to the far-end data sequence received by the DUT, to allow a pseudo noise generator of the DUT to generate an aided-data sequence according to the transmission data, wherein the aided-data sequence is configured to perform cancellation with the far-end data sequence received by the DUT to generate a cancellation result; under a condition where the LP device transmits the far-end data sequence to the DUT and the DUT substantially transmits no data to the LP device, the measuring apparatus obtains a first noise value according to the cancellation result; under a condition where the LP device transmits the far-end data sequence to the DUT and the DUT utilizes at least one circuit therein to transmit the aided-data sequence to the LP device at the same time, the measuring apparatus obtains a second noise value according to the cancellation result; and the measuring apparatus calculates a difference between the first noise value and the second noise value, to estimate noise from the at least one circuit.

The method and measuring apparatus provided by the embodiments of the present invention can obtain data and noise from the LP device first when operations of a transmitting (TX) terminal of the DUT have not started yet, and then obtain a measurement result after the operations of the TX terminal of the DUT start, in order to precisely know the amount of noise being reflected when the TX terminal of the DUT is transmitting data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
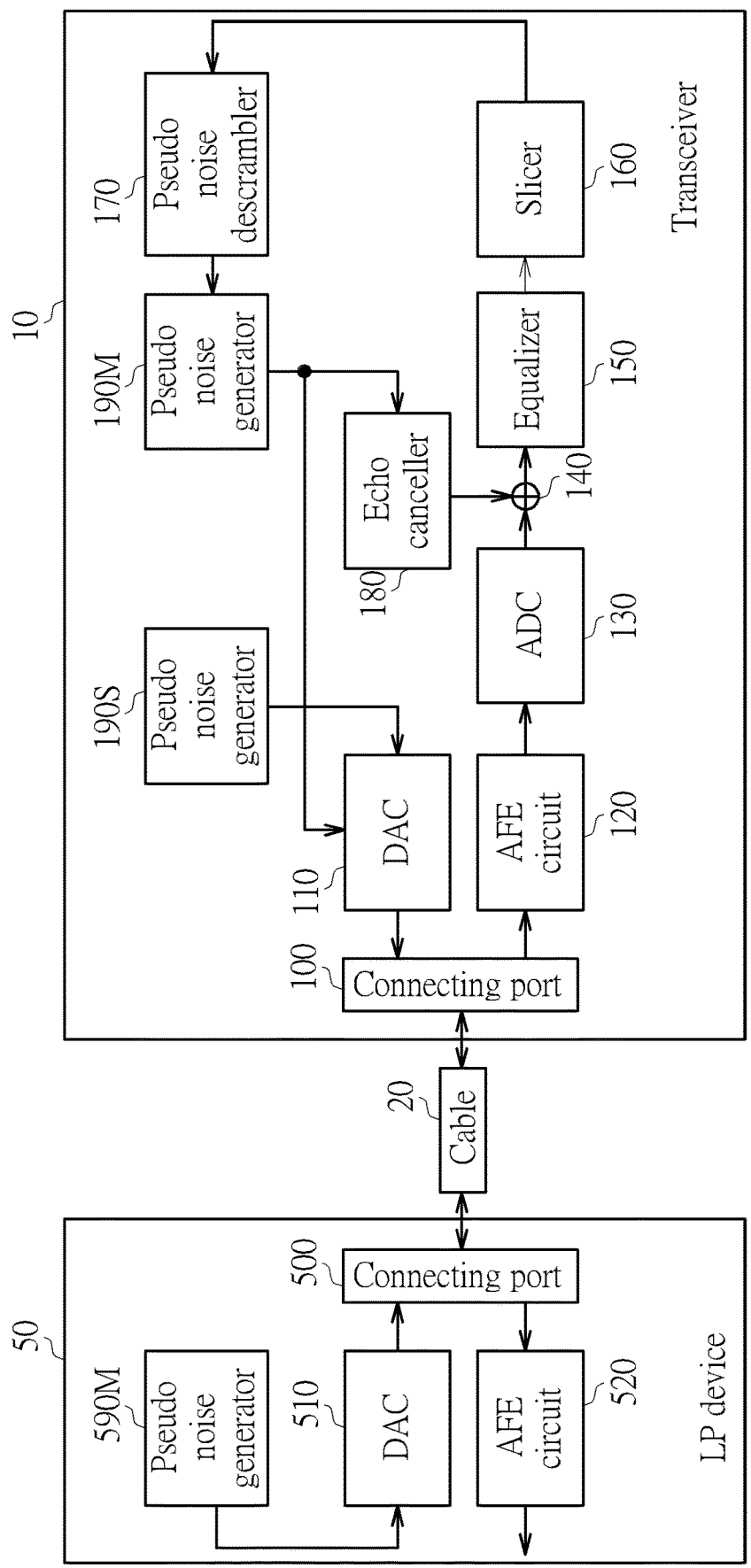
FIG. 1 is a diagram illustrating a transceiver being connected to a link partner (LP) device via a cable according to an embodiment of the present invention.

FIG. 1 is a diagram illustrating a transceiver 10 (e.g., an Ethernet transceiver) being connected to a link partner (LP) device 50 via a cable 20 according to an embodiment of the present invention, where the transceiver 10 is connected to the cable 20 via a connecting port 100 therein, and the LP device 50 is connected to the cable 20 via a connecting port 500 therein. As shown in FIG. 1, the transceiver 10 may include, but is not limited to: a digital-to-analog converter (DAC) 110, an analog front-end (AFE) circuit 120, an analog-to-digital converter (ADC) 130, an adder 140, an equalizer 150, a slicer 160 (e.g., a parser), a pseudo noise descrambler 170, an echo canceller 180, a pseudo noise generator 190M (e.g., a master pseudo noise generator) and a pseudo noise generator 190S (e.g., a slave pseudo noise generator). It is noted that the transceiver 10 may have an identical architecture to the LP device 50 (e.g., the LP device 50 may be an Ethernet transceiver having the same architecture), and the LP device 50 may also comprise the components mentioned above such as a DAC 510, an ADC 520 and a pseudo noise generator 590M (e.g., a master pseudo noise generator). Other components of the LP device 50 do not affect overall operations of the following embodiments, and are therefore omitted in figures for brevity.

Under a condition where both the transceiver 10 and the LP device 50 follow the Ethernet specification, one of the transceiver 10 and the LP device 50 may be set in a master mode, and the other may be set in a slave mode. For example, when the LP device 50 is set in the master mode and the transceiver 10 is set in the slave mode, where the transceiver 10 may utilize the pseudo noise generator 190S (e.g., the slave pseudo noise generator therein) to output a data sequence carrying data to be transmitted to the LP device 50 to the DAC 110, and the DAC 110 may convert this data sequence from a digital format into an analog format for being transmitted on the cable 20. In another example, when the LP device 50 is set in the slave mode and the transceiver 10 is set in the master mode, where the transceiver 10 may utilize the pseudo noise generator 190M (e.g., the master pseudo noise generator therein) to output a data sequence carrying data to be transmitted to the LP device 50 to the DAC 110, and the DAC 110 may convert this data sequence from the digital format into the analog format for being transmitted on the cable 20. For brevity, this embodiment and subsequent embodiments merely describe the condition where the LP device 50 is set in the master mode and the transceiver 10 is set in the slave mode, and related details of the condition where the LP device 50 is set in the slave mode and the transceiver 10 is set in the master mode may be deduced by analogy.

In this embodiment, the LP device 50 may utilize the pseudo noise generator 590M (e.g., the master pseudo noise generator therein) may output a data sequence carrying the data to be transmitted to the transceiver 10 to the DAC 510, and the DAC 510 may convert this data sequence from the digital format into the analog format in order to generate an analog signal that is able to be transmitted via the cable 20. When the transceiver 10 receives the analog signal, the AFE circuit 120 may perform processing upon the analog signal (e.g., perform filtering through a filter therein and/or perform signal amplification through a programmable gain amplifier (PGA) therein) to generate a processed analog signal, and the ADC 130 may convert the processed analog signal from the analog format into the digital format, for obtaining a received data sequence.

In some embodiments, at the same time of the transceiver 10 receiving signals from the LP device 50, the transceiver 10 transmits signals to the LP device 50, and a portion of the signals that the transceiver 10 transmits to the LP device 50 may be reflected from the cable 20 and may be received by the AFE circuit 120. Thus, the echo canceller 180 may generate a cancellation sequence according to a data sequence to be transmitted to the LP device 50. The adder 140 may add the cancellation sequence to the received data sequence to remove data components from the received data sequence caused by the transmitted signal reflected by the cable 20 for generating a cancelled data sequence. Inter-symbol interference may occur during the process of data transmission, which may result in states or waveforms of the received data sequence being unstable; accurate values thereof are hard to be determined or interpreted. For example, assume that the cancelled data sequence is expected to express a logic value "1" representing +9 volts (V) and express a logic value "0" representing −9 V, but a voltage level of the cancelled data sequence at a certain time point keeps varying between +9 V and −9V. This makes it hard to determine whether the voltage level of the cancelled data sequence at this certain time point is +9 V or −9V. Thus, the equalizer 150 may perform equalization processing upon the cancelled data sequence, in order to eliminate or reduce signal jittering or drifting caused by these inter-symbol interferences to thereby correctly determine the values of the cancelled data sequence. Then, the slicer 160 may transmit the determined result to the pseudo noise descrambler 170 for recovering the data transmitted by the LP device 50. Those skilled in this art should understand further detailed implementations of respective components of the transceiver 10 under the Ethernet specification according to FIG. 1 and the above descriptions; these further detailed implementations are omitted here for brevity.

Figure 2:
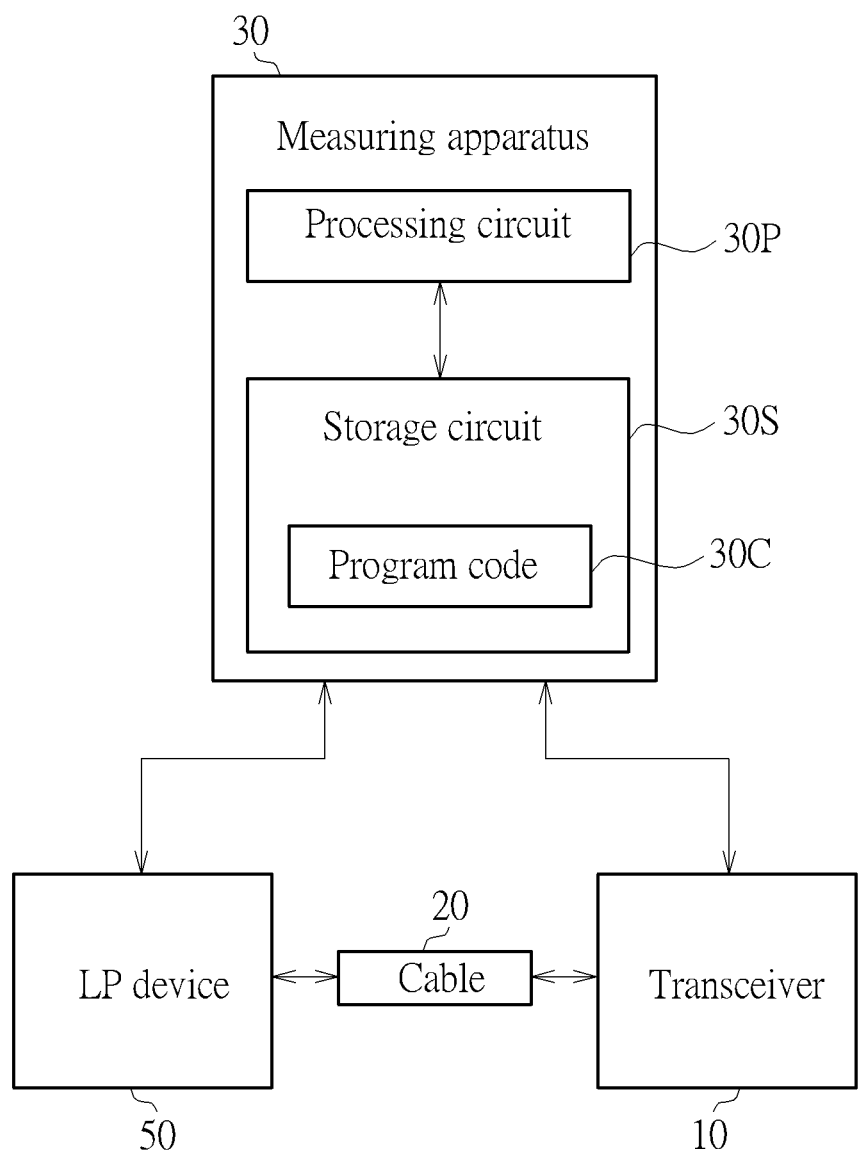
FIG. 2 is a diagram illustrating a measuring apparatus for measuring noise of a device under test (DUT) such as the transceiver shown in FIG. 1 according to an embodiment of the present invention.

FIG. 2 is a diagram illustrating a measuring apparatus 30 for measuring noise of a device under test (DUT) such as the transceiver 10 according to an embodiment of the present invention, where the measuring apparatus 30 may be coupled to the transceiver 10 and the LP device 50. The measuring apparatus 30 may comprise a storage circuit 30S, and a processing circuit 30P coupled to the storage circuit 30S, where the storage circuit 30S may be configured to store a program code 30C, and the processing circuit 30P may be configured to control the measuring apparatus to transmit control signals to the transceiver 10 and the LP device 50 according to the program code 30C.

Figure 3:
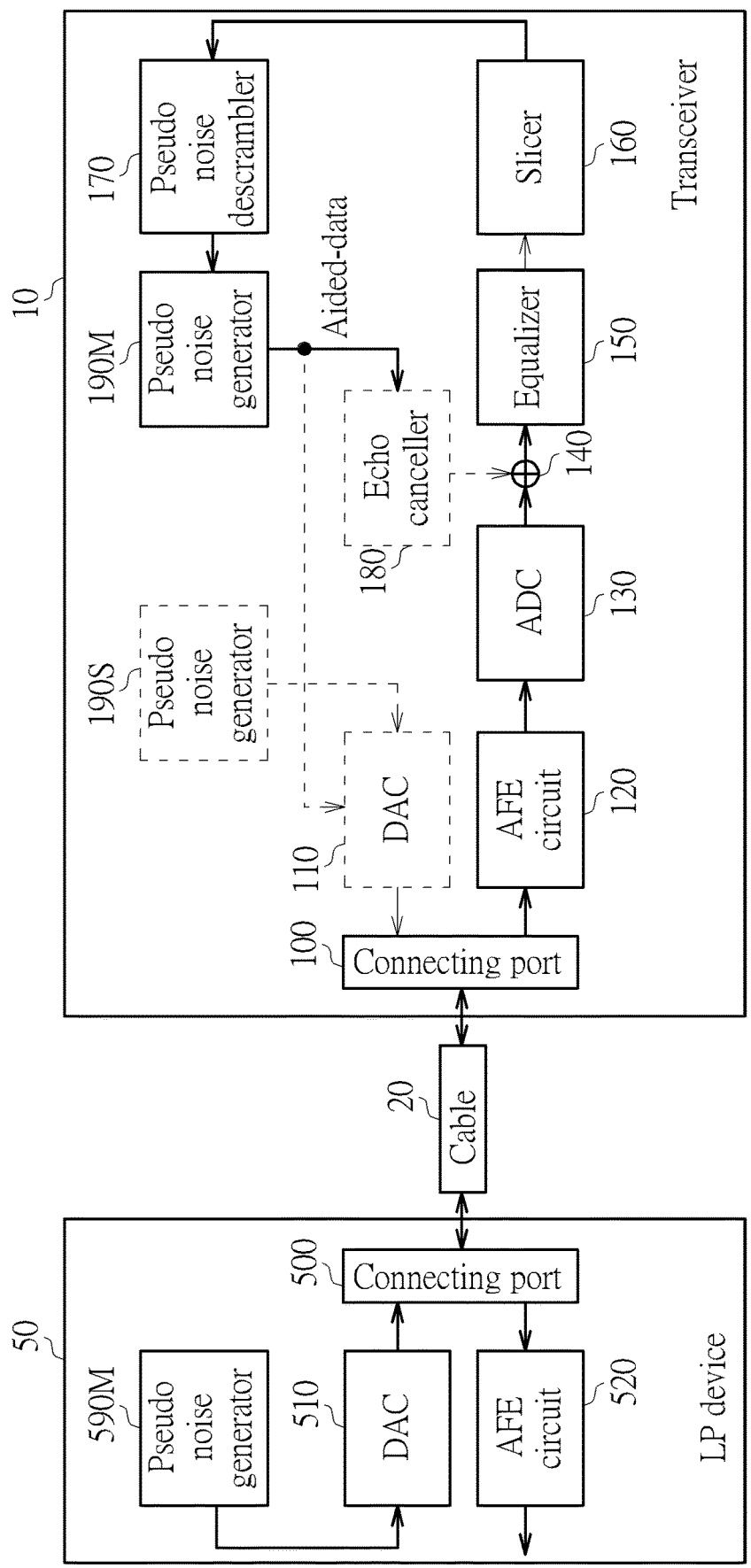
FIG. 3 is a diagram illustrating some configurations of the transceiver shown in FIG. 1 in a measuring flow according to an embodiment of the present invention.
Figure 4:
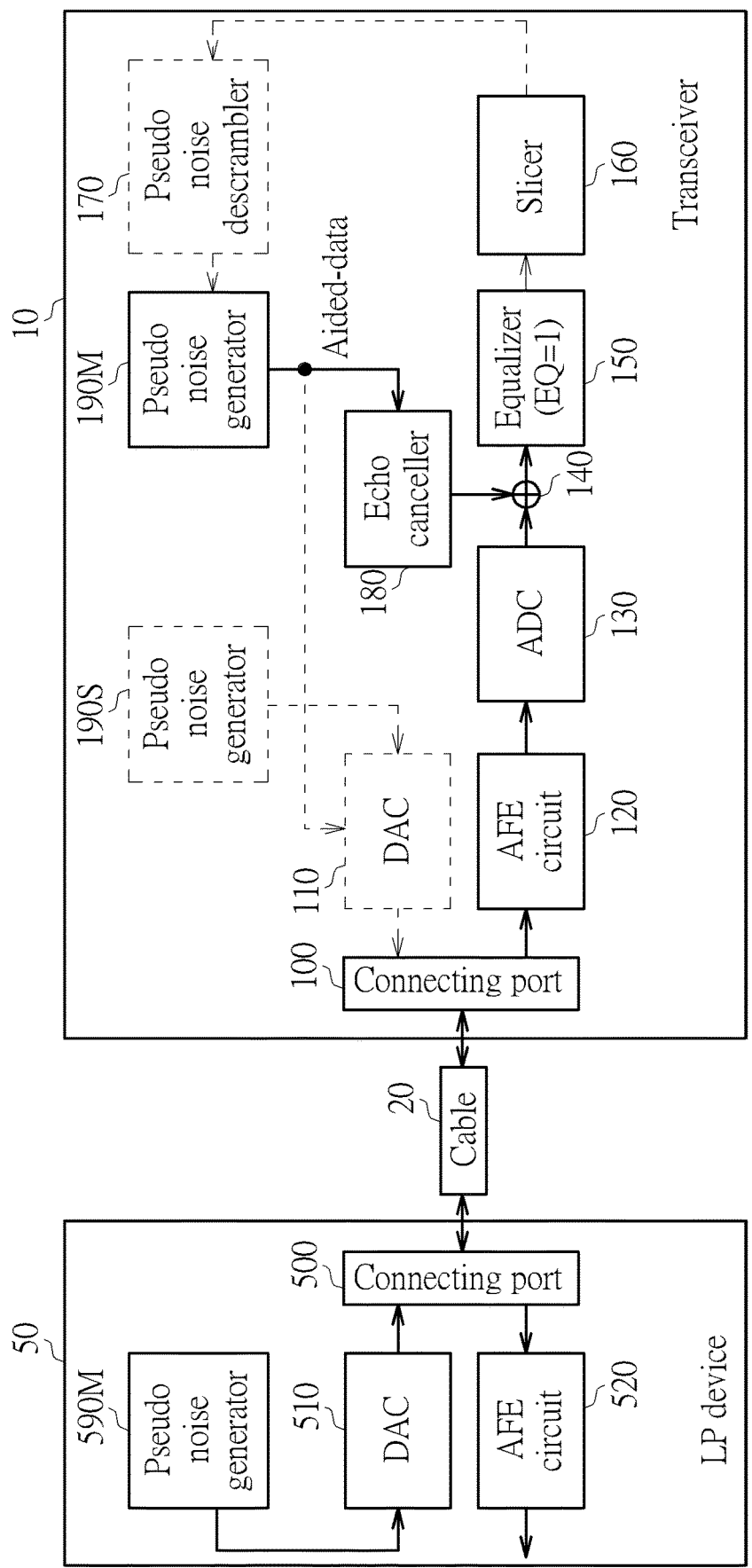
FIG. 4 is a diagram illustrating some configurations of the transceiver shown in FIG. 1 in a measuring flow according to an embodiment of the present invention.
Figure 5:
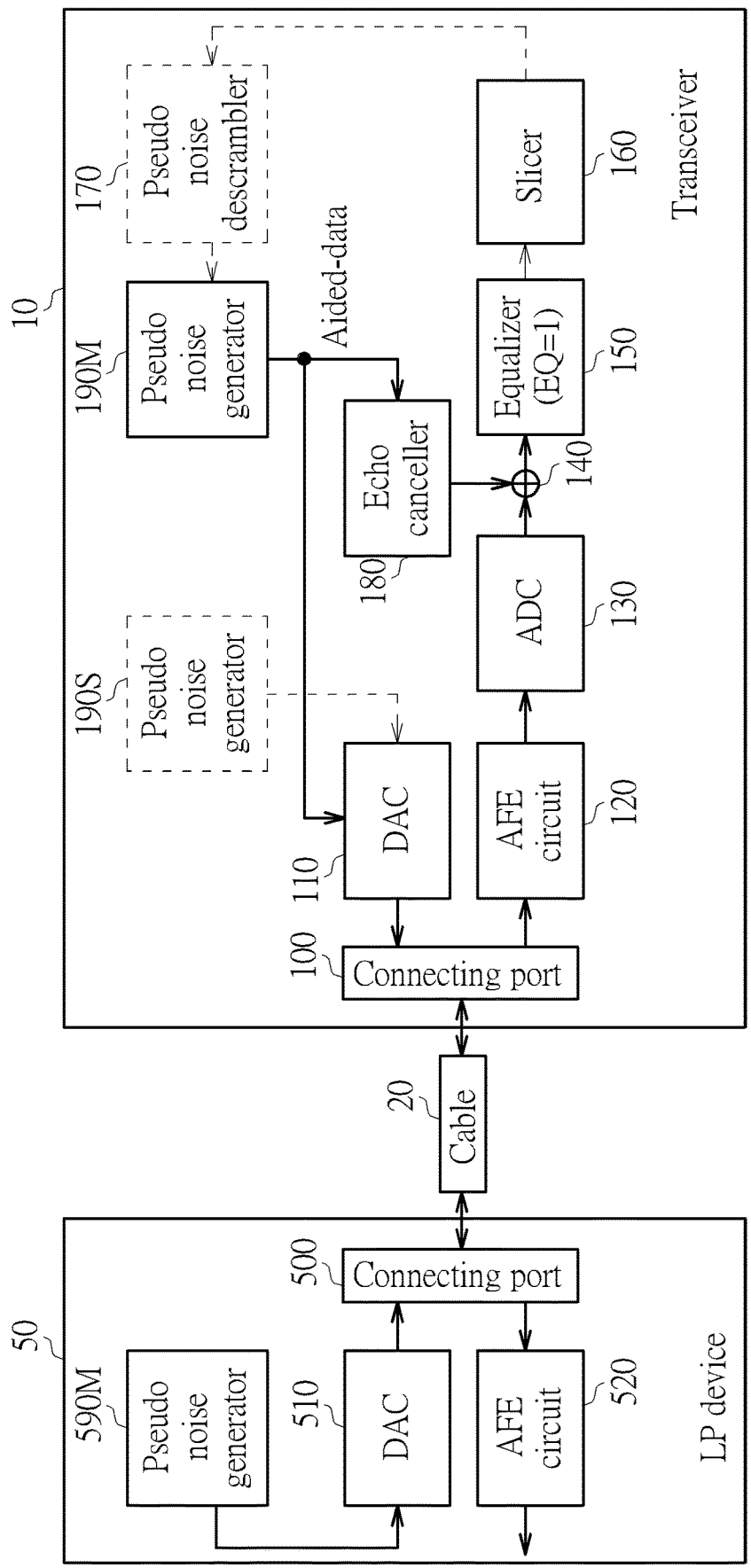
FIG. 5 is a diagram illustrating some configurations of the transceiver shown in FIG. 1 in a measuring flow according to an embodiment of the present invention.

In FIGS. 3-5, components and signal paths depicted in solid lines are enabled, and components and signal paths depicted in dashed lines are disabled.

In the embodiment of FIG. 3, the measuring apparatus 30 may control the transceiver 10 and the LP device 50 to operate in a first training phase TP1, wherein when operating in the first training phase TP1, the measuring apparatus 30 may control a device operating in the master mode to transmit data to a device operating in the slave mode, and prevent the device operating in the slave mode from transmitting any data to the device operating in the master mode. Initially, the measuring apparatus 30 may control the pseudo noise generator 590M of the LP device 50 to generate a far-end data sequence according to transmission data TXdata, and transmit the far-end data sequence to the transceiver 10 via the cable 20. As shown in FIG. 3, the far-end data sequence may be transmitted through a path formed by the DAC 510, the connecting port 500, the cable 20, the connecting port 100, the AFE circuit 120 and the ADC 130, to make the adder 140 obtain the far-end data sequence received by the transceiver 10 (referred to as "the received far-end data sequence" for brevity), where the echo canceller 180 is disabled at this moment, and the adder 140 therefore directly transmits the received far-end data sequence to the equalizer 150. Then, the measuring apparatus 30 may control the pseudo noise descrambler 170 of the transceiver 10 to recover the transmission data TXdata according to the received far-end data sequence. In particular, the measuring apparatus 30 may control the equalizer 150 of the transceiver 10 to perform equalization processing upon the received far-end data sequence to generate an equalized far-end data sequence, and control the slicer 160 of the transceiver 10 to obtain a recovered far-end data sequence according to the equalized far-end data sequence, to allow the pseudo noise descrambler 170 to recover the transmission data TXdata according to the recovered far-end data sequence. As the pseudo noise descrambler 170 is able to recover the transmission data TXdata, the pseudo noise generator 190M of the transceiver 10 may generate an aided-data sequence (labeled "Aided-data" in figures for brevity) according to the transmission data TXdata.

In the embodiment of FIG. 4, the measuring apparatus 30 may control the transceiver 10 and the LP device 10 to keep operating in the first training phase TP1. It is noted that, after the transmission data TX data is recovered, the pseudo noise descrambler 170 may be disabled, and the echo canceller 180 may be enabled. In addition, the pseudo noise generator 190M of the transceiver 10 may have the same architecture as the pseudo noise generator 590M of the LP device, so the pseudo noise generator 190M may generate the same data sequence according to the same transmission data TXdata (e.g., the aided-data sequence generated by the pseudo noise generator 190M may be substantially equal to the far-end data sequence generated by the pseudo noise generator 590M). Based on the above features, the aided-data sequence may be configured to perform cancellation with the received far-end data sequence to generate a cancellation result. It should be noted that the echo canceller 180 is enabled under a condition where a signal-to-noise ratio (SNR) of the equalized far-end data sequence exceeds a first predetermined threshold SNR_eye_open, to make the cancellation result be generated. As the transceiver 10 and the LP device 50 operate in the first training phase TP1 (e.g., the LP device 50 is set in the master mode and the transceiver 10 is set in the slave mode), the measuring apparatus 30 may obtain a first noise value P1 according to the cancellation result under a condition where the LP device 50 transmits the far-end data sequence to the transceiver 10 and the transceiver 10 does not transmit any data to the LP device 50. The transceiver 10 prevents the cancellation result from performing the equalization processing by bypassing the equalizer 150 (labeled "EQ=1" in FIG. 4 for better comprehension), to make the cancellation result be directly transmitted to the slicer 160 for calculating the first noise value P1. Thus, the first noise value P1 may represent a sum of noise provided by the LP device 50 (which may be referred to as a power value P(noise_far) of far-end noise noise_far) and noise provided by a transmission path of the far-end data sequence (which may be referred to as a power value P(noise_rx) of transmission noise noise_rx). It is noted that calculation of the first noise value P1 is performed under a condition where a SNR of the cancellation result exceeds a second predetermined threshold SNR_EC_done.

In the embodiment of FIG. 5, the measuring apparatus 30 may control the transceiver 10 and the LP device 50 to operate in a second training phase TP2, wherein when operating in the second training phase TP2, the measuring apparatus 30 may control a device operating in the master mode to transmit data to a device operating in the slave mode and control the device operating in the slave mode to transmit data to the device operating in the master mode at a same time. As shown in FIG. 5, the DAC 110 may be enabled. Although the transceiver 10 is set in the slave mode, the DAC 110 obtains the aided-data sequence from the pseudo noise generator 190M, which is different from a typical operation defined in the Ethernet specification. Accordingly, the data sequence transmitted to the LP device 50 by the transceiver 10 is the same as the data sequence transmitted by the LP device 50, which enables better measurement of the noise. As the transceiver 10 and the LP device 50 operate in the second training phase TP2 (e.g., the LP device 50 is set in the master mode and the transceiver 10 is set in the slave mode), the measuring apparatus 30 may obtain a second noise value P2 according to the cancellation result under a condition where the LP device 50 transmit the far-end data sequence to the transceiver 10 and the transceiver 10 utilizes at least one circuit therein (e.g., the DAC 110) to transmit the aided-data sequence to the LP device 50 at a same time. The transceiver 10 prevents the cancellation result from performing the equalization processing by bypassing the equalizer 150 (labeled "EQ=1" in FIG. 5 for better comprehension), to make the cancellation result be directly transmitted to the slicer 160 for calculating the second noise value P2. Thus, the second noise value P2 may represent a sum of the noise provided by the LP device (which may be referred to as the power value P(noise_far) of the far-end noise noise_far), the noise provided by the transmission path of the far-end data sequence (which may be referred to as the power value P(noise_rx) of the transmission noise noise_rx), and noise being reflected when transmitting the aided-data sequence to the cable 20 via the DAC 110 (which may be referred to as a power value P(noise_near) of near-end noise noise_near).

After the first noise value P1 and the second noise value P2 are obtained, the measuring apparatus 30 may calculate a difference between the first noise value P1 and the second noise value P2, in order to estimate the noise from noise of the at least one circuit (e.g., the noise which is reflected when the aided-data sequence is transmitted to the cable via the DAC 110 mentioned above, such as the near-end noise noise_near). The near-end noise P(noise_near) obtained based on the method mentioned above is measured under a condition where the other side of the cable is transmitting signals, which is therefore more similar to the real case. Thus, the problem of the related art can be solved.

Figure 6:
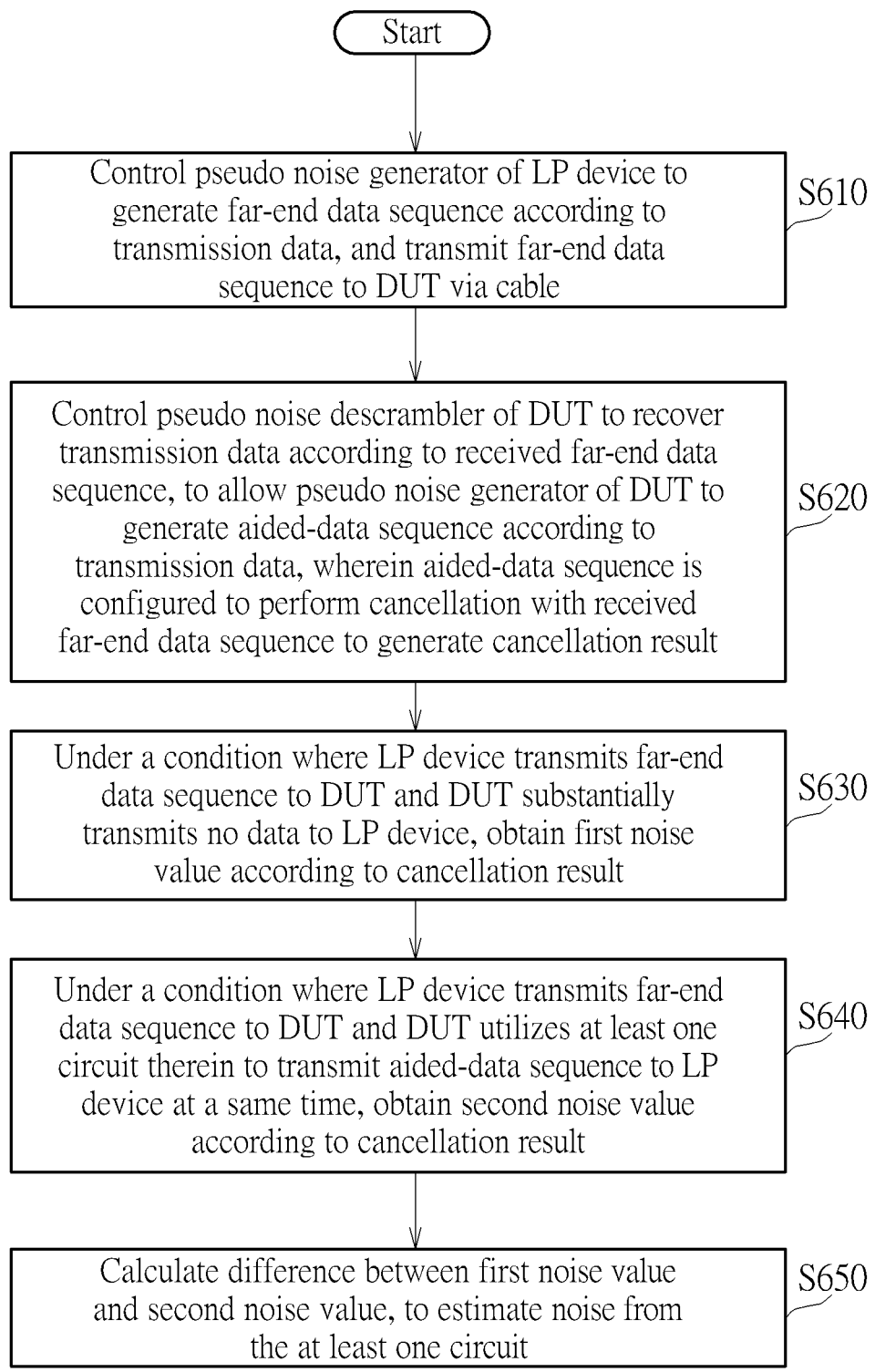
FIG. 6 is a diagram illustrating a working flow of a method for measuring noise of a DUT according to an embodiment of the present invention.

FIG. 6 is a diagram illustrating a working flow of a method for measuring noise of a DUT according to an embodiment of the present invention, where the DUT may be connected to a LP device (e.g., the LP device 50) via a cable (e.g., the cable 20). The working flow of this embodiment is applicable to the measuring apparatus 30 shown in FIG. 2, and the transceiver 10 shown in FIG. 3 to FIG. 5 may be examples of the DUT. It is noted that one or more steps may be added, modified or deleted in the working flow shown in FIG. 6 if an overall result is not hindered, and these steps do not have to be executed in the exact order shown in FIG. 6.

In Step S610, the measuring apparatus 30 may control a pseudo noise generator of the LP device to generate a far-end data sequence according to transmission data, and transmit the far-end data sequence to the DUT via the cable.

In Step S620, the measuring apparatus 30 may control a pseudo noise descrambler of the DUT to recover the transmission data according to the far-end data sequence received by the DUT, to allow a pseudo noise generator of the DUT to generate an aided-data sequence according to the transmission data, wherein the aided-data sequence is configured to perform cancellation with the far-end data sequence received by the DUT to generate a cancellation result.

In Step S630, under a condition where the LP device transmits the far-end data sequence to the DUT and the DUT substantially transmits no data to the LP device, the measuring apparatus 30 may obtain a first noise value according to the cancellation result.

In Step S640, under a condition where the LP device transmits the far-end data sequence to the DUT and the DUT utilizes at least one circuit therein to transmit the aided-data sequence to the LP device at the same time, the measuring apparatus 30 may obtain a second noise value according to the cancellation result.

In Step S650, the measuring apparatus 30 may calculate a difference between the first noise value and the second noise value, to estimate noise from the at least one circuit.

Figure 7:
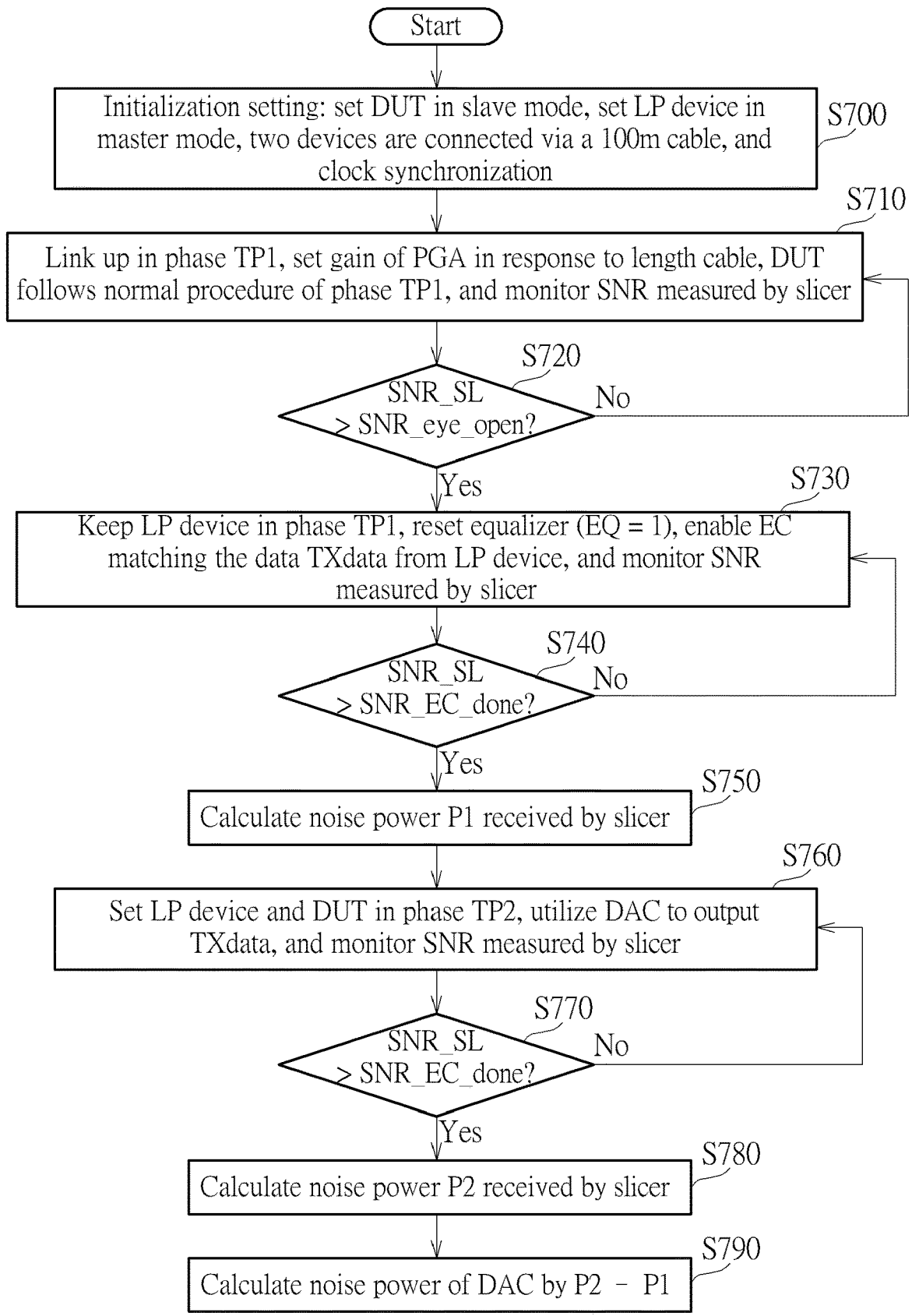
FIG. 7 is an example of the working flow shown in FIG. 6 according to an embodiment of the present invention.

FIG. 7 is a diagram illustrating an example of the working flow shown in FIG. 6 according to an embodiment of the present invention. It is noted that one or more steps may be added, modified or deleted in the working flow shown in FIG. 7 if an overall result is not hindered, and these steps do not have to be executed in the exact order shown in FIG. 7.

In Step S700, the measuring apparatus 30 may perform initialization setting upon the DUT and the LP device. For example, the DUT is set in the slave mode and the LP device is set in the master mode. In addition, the DUT may be connected to the LP device via a cable such as a 100-meter (100 m) cable, and the measuring apparatus 30 may perform clock synchronization of the DUT and the LP device.

In Step S710, the measuring apparatus 30 may link up the DUT and the LP device in the first training phase TP1 (e.g., controlling these devices to operate in the first training phase TP1), and set a gain of a PGA such as the PGA within the AFE circuit 120 in response to the length of the cable (e.g., 100 m). The DUT may follow a normal procedure of the training phase TP1, and the measuring apparatus 30 may monitor a SNR (signal-to-noise ratio) SNR_SL measured by a slicer (e.g., the slicer 160) of the DUT.

In Step S720, the measuring apparatus 30 may determine whether the SNR SNR_SL exceeds the first predetermined threshold SNR_eye_open (labeled "SNR_SL >SNR_eye_open?"). If the determination result shows "Yes", it means the equalization processing of the received far-end data sequence is completed (e.g., the signal thereof is stable), and the flow proceeds with Step S730; and if the determination result shows "No", the flow returns to Step S710.

In Step S730, the measuring apparatus 30 may keep the LP device in the first training phase TP1 and reset the equalizer within the DUT (e.g., setting the equalizer in a bypass mode, labeled "EQ=1"), then enable an echo cancellation (EC) operation matching the data (e.g., TXdata) transmitted from the LP device in the DUT, and monitor the SNR SNR_SL measured by the slicer (e.g., the slicer 160) of the DUT.

In Step S740, the measuring apparatus 30 may determine whether the SNR SNR_SL exceeds the second predetermined threshold SNR_EC_done (labeled "SNR_SL>SNR_EC_done?"). If the determination result shows "Yes", it means the EC operation mentioned above is completed (e.g., the signal thereof is stable), the flow proceeds with Step S750; and if the determination result shows "No", the flow returns to Step S730.

In Step S750, the measuring apparatus 30 may calculate a noise power P1 received by the slicer, where P1=P(noise_far+noise_rx), and P(noise_far+noise Tx) may represent a total power of the far-end noise noise_far and the transmission noise noise_rx.

In Step S760, the measuring apparatus 30 may set the LP device and the DUT in the second training phase TP2, then utilize a DAC (e.g., the DAC 110) of the DUT to output the transmission data TXdata, and monitor the SNR SNR_SL measured by the slicer (e.g., the slicer 160) of the DUT.

In Step S770, the measuring apparatus 30 may determine whether the SNR SNR_SL exceeds the second predetermined threshold SNR_EC_done (labeled "SNR_SL>SNR_EC_done?"). If the determination result shows "Yes", it means the EC operation mentioned above is completed (e.g., the signal thereof is stable), and the flow proceeds with Step S780; and if the determination result shows "No", the flow returns to Step S760.

In Step S780, the measuring apparatus 30 may calculate a noise power P2 received by the slicer, where P2=P(noise_far+noise_rx+noise_near), and P(noise_far+noise_rx+noise_near) may represent a total power of the far-end noise noise_far, the transmission noise noise_rx and the near-end noise noise_near.

In Step S790, the measuring apparatus 30 may calculate a noise power of the DAC of the DUT. For example, the measuring apparatus 30 may calculate a power value P(noise_near) of the near-end noise from the DAC by P2−P1 (e.g., P(noise_near)=P2−P1).

To summarize, the embodiments of the present invention can remove impacts of far-end noise, channel noise and non-ideal effects of an equalizer by controlling a measuring procedure to calculate near-end noise under a condition where a device at another side of a cable is transmitting signals. Thus, the embodiments of the present invention can be more close to a real-world case, thereby solving the problem of the related art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for measuring noise of a device under test (DUT), the DUT being connected to a link partner (LP) device via a cable, the method comprising:

controlling a pseudo noise generator of the LP device to generate a far-end data sequence according to transmission data, and transmitting the far-end data sequence to the DUT via the cable;

controlling a pseudo noise descrambler of the DUT to recover the transmission data according to the far-end data sequence received by the DUT, to allow a pseudo noise generator of the DUT to generate an aided-data sequence according to the transmission data, wherein the aided-data sequence is configured to perform cancellation with the far-end data sequence received by the DUT to generate a cancellation result;

under a condition where the LP device transmits the far-end data sequence to the DUT and the DUT substantially transmits no data to the LP device, obtaining a first noise value according to the cancellation result;

under a condition where the LP device transmits the far-end data sequence to the DUT and the DUT utilizes at least one circuit therein to transmit the aided-data sequence to the LP device at the same time, obtaining a second noise value according to the cancellation result; and calculating a difference between the first noise value and the second noise value, to estimate noise from the at least one circuit.

2. The method of claim 1, wherein an architecture of the pseudo noise generator of the DUT is identical to an architecture of the pseudo noise generator of the LP device.

3. The method of claim 1, wherein the first noise value represents a sum of noise provided by the LP device and noise provided by a transmission path of the far-end data sequence; and the second noise value represents a sum of the noise provided by the LP device, the noise provided by the transmission path of the far-end data sequence, and noise being reflected when transmitting the aided-data sequence to the cable via the at least one circuit.

4. The method of claim 1, wherein controlling the pseudo noise descrambler of the DUT to recover the transmission data according to the far-end data sequence received by the DUT comprises:

controlling an equalizer of the DUT to perform equalization processing upon the far-end data sequence received by the DUT, in order to generate an equalized far-end data sequence; and controlling a slicer of the DUT to obtain a recovered far-end data sequence according to the equalized far-end data sequence, to allow the pseudo noise descrambler to recover the transmission data according to the recovered far-end data sequence.

5. The method of claim 4, wherein the cancellation result is generated under a condition where a signal-to-noise ratio (SNR) of the equalized far-end data sequence exceeds a predetermined threshold.

6. The method of claim 4, wherein the cancellation result is directly transmitted to the slicer for calculating the first noise value and the second noise value by bypassing the equalizer without performing the equalization processing.

7. The method of claim 6, wherein calculating the first noise value and the second noise value is performed under a condition where a SNR of the cancellation result exceeds a predetermined threshold.

8. A measuring apparatus for measuring noise of a device under test (DUT), the DUT being connected to a link partner (LP) device via a cable, the measuring apparatus being coupled to the DUT and the LP device, the measuring apparatus comprising:

a storage circuit, configured to store a program code; and a processing circuit, coupled to the storage circuit, configured to control the measuring apparatus according to the program code, to transmit control signals to the DUT and the LP device, respectively;

wherein:

the measuring apparatus controls a pseudo noise generator of the LP device to generate a far-end data sequence according to transmission data, and transmit the far-end data sequence to the DUT via the cable;

the measuring apparatus controls a pseudo noise descrambler of the DUT to recover the transmission data according to the far-end data sequence received by the DUT, to allow a pseudo noise generator of the DUT to generate an aided-data sequence according to the transmission data, wherein the aided-data sequence is configured to perform cancellation with the far-end data sequence received by the DUT to generate a cancellation result;

under a condition where the LP device transmits the far-end data sequence to the DUT and the DUT substantially transmits no data to the LP device, the measuring apparatus obtains a first noise value according to the cancellation result;

under a condition where the LP device transmits the far-end data sequence to the DUT and the DUT utilizes at least one circuit therein to transmit the aided-data sequence to the LP device at the same time, the measuring apparatus obtains a second noise value according to the cancellation result; and the measuring apparatus calculates a difference between the first noise value and the second noise value, to estimate noise from the at least one circuit.

9. The measuring apparatus of claim 8, wherein an architecture of the pseudo noise generator of the DUT is identical to an architecture of the pseudo noise generator of the LP device.

10. The measuring apparatus of claim 8, wherein the first noise value represents a sum of the noise provided by the LP device and noise provided by a transmission path of the far-end data sequence; and the second noise value represents a sum of the noise provided by the LP device, the noise provided by the transmission path of the far-end data sequence, and noise being reflected when transmitting the aided-data sequence to the cable via the at least one circuit.

11. The measuring apparatus of claim 8, wherein the measuring apparatus controls an equalizer of the DUT to perform equalization processing upon the far-end data sequence received by the DUT, in order to generate an equalized far-end data sequence; and the measuring apparatus controls a slicer of the DUT to obtain a recovered far-end data sequence according to the equalized far-end data sequence, to allow the pseudo noise descrambler to recover the transmission data according to the recovered far-end data sequence.

12. The measuring apparatus of claim 11, wherein the cancellation result is generated under a condition where a signal-to-noise ratio (SNR) of the equalized far-end data sequence exceeds a predetermined threshold.

13. The measuring apparatus of claim 11, wherein the cancellation result is directly transmitted to the slicer for calculating the first noise value and the second noise value by bypassing the equalizer without performing the equalization processing.

14. The measuring apparatus of claim 13, wherein the measuring apparatus calculates the first noise value and the second noise value under a condition where a SNR of the cancellation result exceeds a predetermined threshold.

* * * * *